United States Patent
Leitner et al.

(10) Patent No.: US 12,160,941 B2
(45) Date of Patent: *Dec. 3, 2024

(54) METHOD AND APPARATUSES FOR CONTROLLING THE OUTPUT VOLTAGE OF A VOLTAGE REGULATOR

(71) Applicant: ELMOS Semiconductor SE, Dortmund (DE)

(72) Inventors: Carsten Leitner, Berlin (DE); Andre' Krieger, Berlin (DE); Christian Schmitz, Castrop-Rauxel (DE); Thomas Geistert, Warstein (DE)

(73) Assignee: Elmos Semiconductor SE, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,682

(22) Filed: Jul. 17, 2023

(65) Prior Publication Data

US 2023/0363063 A1    Nov. 9, 2023

Related U.S. Application Data

(63) Continuation of application No. 17/607,050, filed as application No. PCT/DE2020/100438 on May 20, 2020, now Pat. No. 11,751,307.

(30) Foreign Application Priority Data

May 23, 2019   (DE) .................... 10 2019 113 864.7

(51) Int. Cl.
*H05B 45/347*   (2020.01)
*H05B 45/3725*  (2020.01)

(52) U.S. Cl.
CPC ....... *H05B 45/347* (2020.01); *H05B 45/3725* (2020.01)

(58) Field of Classification Search
CPC .. H05B 45/347; H05B 45/3725; H05B 45/46; Y02B 20/30

See application file for complete search history.

(56) References Cited

U.S. PATENT DOCUMENTS 7,157,866 B2   1/2007   Komiya et al.
8,319,449 B2   11/2012  Hoogzaad et al.
(Continued)

FOREIGN PATENT DOCUMENTS

DE        10318780 A1     12/2004
DE     102005028403 A1    12/2006
(Continued)

OTHER PUBLICATIONS

International Search Report Mailed Aug. 3, 2020 re PCT/DE2020/100438 (4 pages).

*Primary Examiner* — Daniel D Chang
(74) *Attorney, Agent, or Firm* — Michael J. McCandlish; Mindful IP PLLC

(57) ABSTRACT

A device includes a voltage regulator, circuits, and a current bus. Each of the circuits includes at least one LED driver. The voltage regulator supplies electrical energy to a plurality of LED groups. Each of the circuits includes a voltage measuring circuit for detecting voltage drops across the LED drivers. The LED drivers set the currents through the LED groups. Each of the circuits includes a local controller. The local controller withdraws a current from the control bus in dependence on the detected voltage drops of the LED drivers included in the circuit. A bias current source injects a bias current into the control bus. The control bus sums the currents in the current bus. The output of the regulator is controlled based on the summed current.

20 Claims, 1 Drawing Sheet

(56) References Cited

U.S. PATENT DOCUMENTS

| | | |
|---|---|---|
| 8,519,632 B2 | 8/2013 | Krespach et al. |
| 2007/0139317 A1 | 6/2007 | Martel et al. |
| 2008/0122383 A1 | 5/2008 | Katoh |
| 2009/0212717 A1 | 8/2009 | Trattler |
| 2009/0230874 A1 | 9/2009 | Zhao et al. |
| 2010/0026209 A1 | 2/2010 | Liu |
| 2010/0201278 A1 | 8/2010 | Zhao |
| 2011/0012521 A1 | 1/2011 | Byun et al. |
| 2011/0043114 A1 | 2/2011 | Hsu et al. |
| 2011/0043138 A1* | 2/2011 | Hsu ................... H05B 45/46 315/297 |
| 2012/0268012 A1 | 10/2012 | Walker |
| 2022/0210889 A1 | 6/2022 | Leitner et al. |

FOREIGN PATENT DOCUMENTS

| | | | |
|---|---|---|---|
| DE | 102006055312 A1 | 8/2007 | |
| EP | 1499165 A3 | 3/2005 | |
| EP | 2600695 A1 | 6/2013 | |
| EP | 2293165 B1 | 1/2018 | |
| KR | 20110123864 A | 11/2011 | |
| WO | WO-2006136321 A1 * | 12/2006 | ......... H05B 33/0827 |
| WO | 2013030047 A1 | 3/2013 | |
| WO | WO-2015036551 A1 * | 3/2015 | ......... H05B 33/0824 |

* cited by examiner

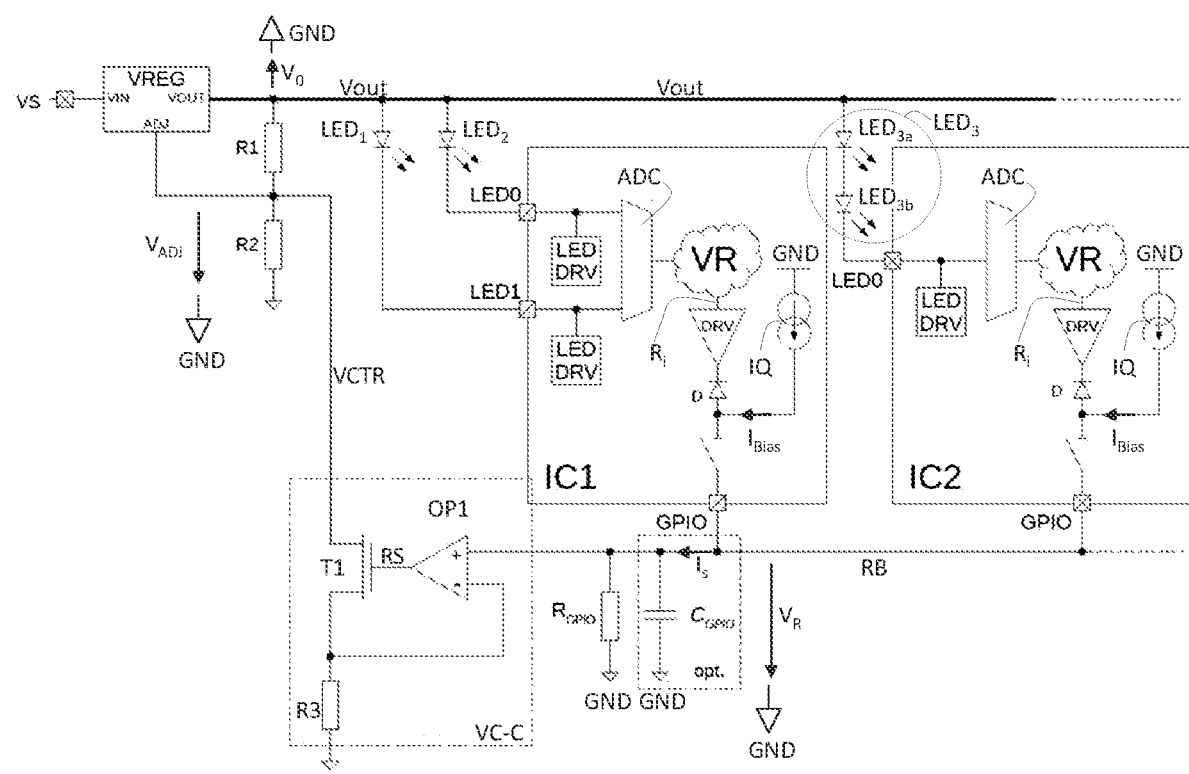

METHOD AND APPARATUSES FOR CONTROLLING THE OUTPUT VOLTAGE OF A VOLTAGE REGULATOR

CROSS-REFERENCE TO RELATED APPLICATIONS

This application is a continuation of, and claims priority to U.S. Ser. No. 17/607,050, filed Oct. 28, 2021, which is a national stage of, and claims priority to, Patent Cooperation Treaty Application No. PCT/EP2020/100438, filed on May 20, 2020, which claims the priority of German Patent Application 10 2019 113 864.7, filed May 23, 2019, the contents of each of which are incorporated into the subject matter of the present application by reference.

BACKGROUND

LED lighting is increasingly being used in the automotive industry. The problem here is that the light-emitting diodes do not all have the same threshold voltage, but the LEDs are all supplied with electrical energy from a voltage source. The luminosity of the LEDs is typically set via respective power sources. These power sources drop electrical power that has to be minimized. The voltage source is preferably an energetically favorable switching converter, such that the switching converter generates little waste heat. A problem appears in how several integrated circuits, each typically having several LED current sources, can regulate such an upstream voltage source in an efficient and easy way.

For example, the following documents from the technical field of the disclosure are known from the prior art:

A drive device for a colored background light is known from DE 10 2006 055 312 A1. Each LED string is connected with one voltage source and one current source in a complex way to circumvent the problem of the combined control.

DE 10 318 780 A1 discloses a control circuit for generating two or more regulated or controlled constant currents through one consumer each, e.g., a LED, with a common in the size adjustable supply voltage supplying the individual constant current sources. The technical teaching of DE 10 318 780 A1 is characterized in that the size of the supply voltage is adjusted to the constant current source which generally or at the respective point in time feeds the greatest total impedance and thus requires the greatest supply voltage. The amount of the supply voltage is set so minimally that the amount of the voltage occurring across one of the power sources is just sufficient for its operation. The regulation of several LED branches is done by a Diode selection control, which selects a minimum voltage of a power source.

An electronic device for controlling a light-emitting semiconductor device is known from U.S. Pat. No. 8,319,449 B2. The device of U.S. Pat. No. 8,319,449 B2 comprises:
 a feedback port configured and arranged to receive a detection value,
 an output port that is configured and arranged to supply the light emitting device responsive to a current source and
 a control circuit electrically decoupled or isolated from the light emitting semiconductor device.

The control circuit is configured and arranged in such a way that, in response to the detection value received from the controller, it controls a switched-mode power supply via the output port in order to supply the semiconductor light-emitting device. The controller of the switched-mode power supply is supplied via the feedback input, which indicates a voltage across the current source in order to determine a current through the light-emitting semiconductor device. The switched-mode power supply is controlled in such a way that the voltage across the current source is kept at the minimum level necessary for device operation. A circuit selects the minimum current source voltage as the control voltage for the voltage source.

An LED driver circuit for controlling an LED light source is known from US 2010/026209 A1. The LED driver circuit of US 2010/0 026 209 A1 comprises a regulator which is coupled to the LED light source in order to supply it with an output voltage, a current source which is coupled to the LED light source in order to adjust its drive current; and a controller coupled to the current source and the regulator for sensing a voltage of the current source to generate a control signal for the regulator to regulate the output voltage. The technical teaching of US 2010/0 026 209 A1 does not solve the problem of how several controllers can be coupled with one another with little effort.

A drive device for a light-emitting element is known from U.S. Pat. No. 7,157,866 B2. According to the technical teaching of U.S. Pat. No. 7,157,866 B2, this includes a booster circuit for increasing a given power supply voltage in order to generate a required booster voltage at an output end of the booster circuit, a voltage switching circuit for selectively outputting the power supply voltage or step-up voltage at one switching voltage output end of the voltage switching circuit, a first driver connected in series with a first light emitting element group and connected between the switched voltage output end and a reference voltage node, the first driver being controlled by a first command signal, and a second driver connected in series with a second light emitting element group resulting in a larger voltage drop than the first group, and connected between the output end of the step-up voltage output and the reference voltage node, the second driver being controlled by a second command signal. The technical teaching of U.S. Pat. No. 7,157,866 B2 does not solve the problem of how several controllers can be coupled to one another with little effort.

EP 1 499 165 B1 discloses a load driver device for driving multiple loads, each of which is connected in series with an associated constant current source, wherein the load drive device comprises a power supply circuit providing an output voltage for the multiple loads that can be achieved by converting an input voltage into the output voltage. The technical teaching of EP 1 499 165 B1 is characterized in that the constant current sources are of an adjustable type, and each of the constant current sources is able to supply an adjustable constant output current for the corresponding load; and in that the output voltage is controlled to hold constant a lowest one of the voltages at the common node between each of the multiple loads and its respective constant current source. The technical solution of the EP 1 499 165 B1 is similar to one of the solutions described above. The technical teaching of EP 1 499 165 B1 also does not solve the problem of how several controllers can be coupled to one another with little effort. The voltage signals make the solution very susceptible to EMC signals and potential misalignments.

A control device for at least one series connection of several light-emitting diodes is known from U.S. Pat. No. 8,519,632 B2. A control device according to the technical teaching of U.S. Pat. No. 8,519,632 B2 comprises a voltage regulating unit able to regulate the operating voltage for the at least one series connection of the light-emitting diodes, and a current control unit for each of the at least one series connection of light-emitting diodes, wherein the current control unit is set up to regulate the current through the specific series connection of light-emitting diodes, and wherein the current control unit is connected to the voltage control unit to transmit a current control signal to the voltage control unit. The voltage regulating unit contains a voltage divider, wherein the voltage divider is connected between an operating voltage of the at least one series connection of light-emitting diodes and ground, wherein the operating voltage is provided by the voltage regulating unit. A tap of the voltage divider and an input of a first control stage are connected to an output of a second control stage, so that if the current control signal exceeds a predetermined voltage, a voltage at the tap of the voltage divider is reduced. The technical teaching of U.S. Pat. No. 8,519,632 B2 also uses voltage signals that are selected by diodes (reference numbers 51, 52, 53 of U.S. Pat. No. 8,519,632 B2). The voltage signals make the solution very susceptible to EMC signals and potential misalignments.

A current source arrangement is known from DE 10 2005 028 403 B4, in which the voltage regulator uses a voltage signal to signal the voltage dropping below a minimum voltage drop in one of the power sources for supplying an LED string is communicated. The voltage signals make the solution very susceptible to EMC signals and potential misalignment.

A solution is known from WO 2013/030 047 A1 in which, for each current source, a voltage signal corresponding to the voltage drop across this current source is transmitted analogously to a central unit and there transmitted in a voltage control signal for controlling a common power supply. The voltage signals make the solution very susceptible to EMC signals and potential misalignments.

US 2008/0 122 383 A1 discloses an LED driver for feeding electrical current into an LED circuit, which consists either of a single LED or a plurality of LEDs that are connected to one another in series, wherein the LED Driver sets a constant current circuit part that is serially connected to the LED circuit and a current to a predetermined value flowing from an upstream to a downstream side thereof, a voltage setting part that is serially connected to the constant current circuit part, wherein the voltage setting part adjusts a potential difference between the upstream and downstream sides with a switching regulator. The technical teaching of US 2008/0 122 383 A1 also does not solve the problem of how several controllers can be coupled with one another with little effort.

Also, from US 2011/0 043 114 A1, US 2007/0 139 317 A1, US 2009/0 230 874 A1, US 2012/0 268 012 A1, EP 2 600 695 B1 and US 2011/0 012 521 A1 solutions are known in which, for each current source, a voltage signal is transmitted analogously to a central unit corresponding to the voltage drop across this current source. There, the voltage signal is transmitted in a voltage control signal for controlling a common voltage supply. The voltage signals make the solution very susceptible to EMC signals and potential misalignments.

A solution is known from US 2010/0201278 A1 in which the controllers are connected in a loop. Each controller determines the voltage values of the voltage drops across its LED power sources and compares the minimum value of these voltage values with a voltage value at a voltage value input. If the own minimum voltage value is less than this voltage value at the voltage value input, the respective controller sends its minimum voltage value to the voltage value input of the following controller. If the own minimum voltage value is greater than this voltage value at the voltage value input, the respective controller sends this voltage value at the voltage value input to the voltage value input of the downstream controller. The voltage signals make the solution very susceptible to EMC signals and potential misalignments.

US 2011/0 012 521 A1 requires the reference values to be transmitted over a plurality of lines (reference symbols Vf1~Vfi, Vfi+1~Vf2i, Vf2i+1~Vf3i in FIG. 1 of US 2011/0 012 521 A1). This results in a considerable amount of wiring and a considerable number of rules. The evaluation is carried out in the technical teaching of US 2011/0 012 521 A1 by a Microcomputer, which results in the need for an analog-to-digital converter and a PWM unit for digital-to-analog conversion.

US 2010/0201278 A1 discloses a method and a device for regulating an output voltage. In the technical teaching of US 2010/0201278 A1, each LED driver determines a minimum voltage value for the voltage drops across its LED power sources, compares this voltage drop value with its predecessor in a chain and transmits the minimum voltage value of these two voltage values to its successor. In the event of a driver failure, the control system will fail completely.

SUMMARY

The proposal is therefore based on the object of creating a solution which does not have the above disadvantages of the prior art and has further advantages.

This is achieved by a method and a device according to the independent claims.

Disclosed are a method and associated devices for regulating the output voltage ($V_O$) at the output ($V_{out}$) of a voltage regulator (VREG) for supplying a lighting device with electrical energy, wherein the lighting device comprises several, but at least two circuits (IC1, IC2) with at least one LED Group ($LED_1$, $LED_2$, $LED_3$) with an associated LED power source (LED DRV), and wherein each circuit (IC1, IC2) is supplied with electrical energy.

Here, LED is a light-emitting diode. An LED group can be an interconnection of several LEDs connected in parallel and/or in series, wherein the LED group has a first terminal and a second terminal and emits light when voltage is applied between the first terminal and the second terminal in correct polarity.

The voltage regulation is preferably carried out as shown in FIG. 1. Disclosed is a current-controlled voltage regulator, which comprises an actual voltage-controlled Voltage regulator (VREG), as it is widely known from patent literature, and a surrounding circuitry (R1, R2, VC-C, $R_{GPIO}$).

The proposed device comprises several, at least two, integrated circuits (IC1, IC2). In the following, these integrated circuits (IC1, IC2) are also referred to as "ICs".

The individual ICs (IC1, IC2) feed an only essentially equal bias current ($I_{Bias}$) into a control bus (RB) via a respective control bus connection (GPIO) of their terminals by means of a current source (IQ) associated with the respective IC (IC1, IC2). For example, this bias current ($I_{Bias}$) is set at the factory, so that it deviates from IC to IC by no more than 25%, preferably no more than 10%, preferably no more than 5%, preferably no more than 2% from IC to IC within the group of ICs. Experience shows that a deviation of 10% is possible for many applications without destroying the operability. However, it is recommended to carry out these currents as precisely as possible. The sum current ($I_S$) from the current sum of the injected bias currents ($I_{Bias}$) of all integrated circuits (IC) connected to the control bus (RB) drops against ground via a resistor ($R_{GPIO}$). The control voltage ($V_R$) generated from the current sum of the injected bias currents ($I_{Bias}$) of all integrated circuits (IC)

connected to the control bus (RB) is amplified to a control signal (RS) via the amplifier (OP1). The output of the amplifier (OP1) in the form of the control signal (RS) is connected to the control input of a first transistor (T1). This first transistor (T1) is connected as a source follower. The negative feedback resistor of this source follower is a third resistor (R3). Thus, the control voltage ($V_R$) determines the current through the negative feedback resistor (R3). This current is the value of the voltage control signal (VCTR). This current of the voltage control signal (VCTR) also flows through a first resistor (R1) of a voltage divider consisting of a first resistor (R1) and a second resistor (R2), since the input of the voltage regulator (VREG) is preferably high impedance compared to these resistors (R1, R2)). Therefore, the input resistance of the voltage regulator (VREG) can typically be neglected. The second resistor (R2) thereby conducts a further current to ground (i.e., the reference potential (GND)). The sum current of the current through the negative feedback resistor, the current through third resistor (R3), and the current through the second resistor (R2) also flows through the first resistor (R1). Thus, the potential difference at the input (ADJ) of the voltage regulator (VREG) with respect to the reference potential (GND) depends on the output potential of the voltage regulator output ($V_{out}$) of the voltage regulator (VREG) minus the voltage that drops across the first resistor (R1). The voltage regulator (VREG) provides an output voltage ($V_{out}$) versus ground potential that depends on this input voltage difference (potential at the input (ADJ) of the voltage regulator (VREG) versus the reference potential (GND)). The nature of the voltage regulator (VREG) can be left open here. For example, it may be a linear regulator and/or a switching regulator. This output voltage ($V_{out}$) supplies electrical energy to the LEDs ($LED_1$, $LED_2$, $LED_{3a}$, $LED_{3b}$) of the LED groups ($LED_1$, $LED_2$, $LED_3$). Different from the example of the FIGURE, the chain of integrated circuits (IC1, IC2) for supplying multiple LED groups may include more than one and/or more than two and/or more than three and or even more integrated circuits (IC1, IC2) and/or more than one LED group per integrated circuit (IC1, IC2) of these integrated circuits. An LED group ($LED_1$, $LED_2$, $LED_3$) in this sense can thereby consist of a single LED but also of an interconnection, in particular of a parallel and/or series connection of several LEDs. In the following, the term LED therefore also includes such interconnections of several LEDs to form an LED group, even if the term is used in the singular. In the case of interconnections of several LEDs, similar interconnections are clearly preferred for driving by the different integrated circuits (IC1, IC2). The current through each of the LED groups or LEDs ($LED_1$, $LED_2$, $LED_{3a}$, $LED_{3b}$) is respectively controlled by a respective current source associated with that LED group ($LED_1$, $LED_2$, $LED_3$) in the form of a respective LED driver (LED DRV) of a circuit (IC1, IC2). This current source, the LED driver (LED DRV), is preferably part of the respective integrated circuit (IC1, IC2). An integrated circuit (IC1, IC2) can comprise several such current sources, LED drivers (LED DRV) and thus supply several LED groups with electrical energy. The voltage drop across each LED group ($LED_1$, $LED_2$, $LED_3$), which is supplied with electrical energy by an LED driver (LED DRV) of an integrated circuit (IC1, IC2), is detected by an analog-to-digital converter (ADC) of the respective integrated circuit (IC1, IC2) as the potential of the corresponding LED terminal (LED0, LED1) of the respective integrated circuit (IC1, IC2) with respect to the reference potential (GND). For this purpose, the analog-to-digital converter (ADC) of the respective integrated circuit (IC1, IC2) preferably has a multiplexer in order to be able to switch between the different LED groups ($LED_1$, $LED_2$, $LED_3$), which are supplied with electrical energy by the LED drivers (LED DRV) of the integrated circuit (IC1, IC2), in time-division multiplex. Such an integrated circuit (IC1, IC2) can thus be provided and designed to supply n LED groups ($LED_1$ to $LED_n$) with electrical energy via typically n LED connections (LED0 to LED(n−1)) by means of n LED drivers (LED DRV) of this integrated circuit (IC1, IC2), where n is a positive integer. However, it is conceivable to lead a connection node to the outside via a larger number of connections. For the purposes of this document, connections of an integrated circuit that are short-circuited in this way are considered to be a single connection, since the electrical function is to be decisive here and not the mechanical realization. In the example of FIG. 1, n=3. Therefore, in the following, the indices "n" with respect to FIG. 1 are to be understood as with an index "3". Each LED group of the n LED groups ($LED_1$ to $LED_n$) can consist of a single LED ($LED_1$, $LED_2$), as already described, but also of interconnections ($LED_3$) of several LEDs ($LED_{3a}$, $LED_{3b}$). The n measured values of the analog-to-digital converter (ADC) for the n LED groups ($LED_1$ to $LED_n$) are the input values for the one respective local controller (VR) of the respective integrated circuit (IC1, IC2). The local controller (VR) thus receives n voltage values for the n potentials of the n LED terminals (LED1, LED0) of the integrated circuit (IC1, IC2) with respect to a reference potential (GND). This local controller (VR) generates according to an algorithm, for example by selecting the minimum voltage value from the n potential differences between the said n measured values of the analog-to-digital converter (ADC) for the potentials at the n LED terminals of the n LED groups ($LED_1$ to $LED_n$) of the integrated circuit (IC1, IC2) with respect to the reference potential (GND) as a local control value, from the control deviations of these voltage drops of the respective current sources (LED DRV) of the respective LED groups, i.e. from the n potential differences between the said n measured values of the analog-to-digital converter (ADC) for the potentials at the n LED terminals of then LED groups ($LED_1$ to $LED_n$) of the integrated circuit (IC1, IC2) with respect to the reference potential (GND), an internal control signal ($R_i$).

Part of the local controller (VR) of an integrated circuit (IC1, IC2) is in each case a digital-to-analog converter of this integrated circuit, which controls at least one driver (DRV), which can also be part of the digital-to-analog converter of the integrated circuit (IC1, IC2). The local controller (VR) of the integrated circuit (IC1, IC2) is now designed in such a way that the respective driver or drivers (DRV) of an integrated circuit (IC1, IC2) now each draw an additional, respective current from the control bus (RB) when the determined minimum voltage drop of all voltage drops across the respective current sources (LED DRV) of this integrated circuit (IC1, IC2) between the respective LED connection (LED0, LED1) and the reference potential is too low, i.e. its absolute value is below a predefined threshold value. A diode (D) prevents a current from being injected by the driver (DRV) into the control bus (RB) and only allows a current to be drawn from the control bus (RB).

The various current sources (IQ) and drivers (DRV) of the different bus components (integrated circuits (IC1, IC2)) operate on the common control bus (RB).

The control bus (RB) preferably always has the lowest voltage against the reference potential (GND).

When the potential is shifted, the lowest output voltage of the driver (DRV) with the lowest output potential always determines the voltage on the control bus (RB) against the reference potential.

For continuous-time control, it is necessary that the sampling period of the LED terminals (LED0, LED1) of the integrated circuits (IC1, IC2) by the analog-to-digital converters (ADC) is selected to be much smaller than the control time constant for the subsequent control loop, in order to keep the resulting control error small. For this purpose, the resistor ($R_{GPIO}$) for converting the sum current ($I_s$) into a voltage can be replaced by a more complex network of complex components such as resistors, capacitors, and coils. In the example of FIG. 1, an exemplary integration capacitor ($C_{GPIO}$) is optionally provided to increase the time constant and thus reduce quantization errors.

BRIEF DESCRIPTION OF THE DRAWINGS

FIG. 1 shows an exemplary device for regulating a voltage regulator for supplying at least two LED groups.

DESCRIPTION

The disclosure relates to a method for regulating the output voltage ($V_0$) at the output ($V_{out}$) of a voltage regulator (VREG) for supplying a lighting device with electrical energy, wherein the lighting device comprises several, but at least two, circuits (IC1, IC2) with at least one LED group ($LED_1$, $LED_2$, $LED_3$) and an appropriate current source (LED DRY) per circuit (IC1, IC2).

The method, shown in FIG. 1, comprises at least the following steps:

First, a supply voltage ($V_0$) is generated by means of the voltage regulator (VREG) at the output ($V_{out}$) of this voltage regulator (VREG).

Next, a respective LED group current ($I_{LED1}$, $I_{LED2}$, $I_{LED3}$) is set by the LED groups ($LED_1$, $LED_2$, $LED_3$) by means of a current source (LED DRV) for each LED group ($LED_1$, $LED_2$, $LED_3$). In the example of FIG. 1, the LED groups ($LED_1$, $LED_2$, $LED_3$) are distributed on two circuits (IC1, IC2). Devices having more than two circuits and more than three LED groups are expressly intended to be included in the claims and to be considered as disclosed herein.

Next, the detection of the respective voltage drop across respective current sources (LED DRV) of the LED groups (LED1, LED2, LED3) is performed as the respective voltage drop value of this current source (LED DRY). This is preferably done in each of the circuits (IC1, IC2) for preferably each of the current sources (LED DRV).

Next, in preferably each circuit (IC1, IC2), a voltage drop value of the voltage drop values of the current sources (LED DRV) of this circuit is selected as the characteristic voltage drop value of this circuit from among the voltage drop values determined for this circuit. Thus, one characteristic voltage drop value is preferably obtained for each circuit. It is performed as nothing else than determining a respective voltage drop value of a current source (LED DRV) of each circuit (IC1, IC2) from the voltage drop values of the current sources (LED DRV) of that respective circuit (IC1, IC2) as a characteristic voltage drop value of that circuit (IC1, IC2). Preferably, the characterizing voltage drop value of this circuit (IC1, IC2) is the minimum voltage drop value of the determined voltage drop values of this circuit (IC1, IC2).

Next, each of the circuits (IC1, IC2) draws an electric current associated with it, its draw current, from a control bus (RB). This represents a withdrawal of a respective withdrawal current of the respective circuit (IC1, IC2) from a control bus (RB) by each of these circuits (IC1, IC2). The amount of this respective withdrawal current of the respective circuit (IC1, IC2) is to depend thereby on the deviation of its characteristic voltage drop value from a set value. This setpoint is preferably common to all circuits and thus selected or set the same for all circuits (IC1, IC2) within a tolerance interval.

Preferably, each circuit (IC1, IC2) feeds a substantially constant bias current (bias) into the control bus (RB). However, a single injection is usually sufficient for proper operation. Theoretically, solutions without bias current injection are also conceivable with greater circuitry effort, but are not preferred here.

By feeding the current into the control bus (RB), all extraction currents and at least one optional constant bias current ($I_{Bias}$) are summed up to a common sum current ($I_S$). Thus is disclosed a low-effort, easy, and inexpensive to implement generation of a common sum current and its subsequent use as a control signal. The output voltage ($V_0$) of the voltage regulator (VREG) is then regulated at its output ($V_{out}$) as in dependence of the sum current ($I_S$). In the example of FIG. 1, several current-voltage conversions and voltage-current conversions are performed for circuit reasons. Theoretically, however, direct control of the voltage regulator with this current signal is conceivable if the voltage regulator has a current input for controlling its reference value. In the example of FIG. 1, however, a voltage input for the voltage regulator (VREG) is assumed.

The corresponding device for supplying several, but at least two LED groups ($LED_1$, $LED_2$, $LED_3$) with electrical energy therefore preferably comprises a voltage regulator (VREG), at least two circuits (IC1, IC2), a voltage-to-current converter (VC-C), a control bus (RB), a resistor ($R_{GPIO}$) and a resistor network (R1, R2). Each of the circuits (IC1, IC2) preferably has at least one LED connection (LED0, LED1) for at least one LED group ($LED_1$, $LED_2$, $LED_3$), at least one LED driver (LED DRV) per LED group ($LED_1$, $LED_2$, $LED_3$) for supplying power to this LED group ($LED_1$, $LED_2$, $LED_3$) via an LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) inject one or more bias currents ($I_{Bias}$) into the control bus (RB) in the form of a sum current of the injected bias currents ($I_{Bias}$) in order to set the operating point correctly. The resistor ($R_{GPIO}$) performs a current-to-voltage conversion of the sum current ($I_S$) into a control voltage ($V_R$). The voltage-to-current converter (VC-C) converts the control voltage ($V_R$) into a current of a voltage control signal (VCTR). The resistor network (R1, R2) converts the current of the voltage control signal (VCTR) into a voltage value ($V_{ADJ}$). The output voltage ($V_0$) of the voltage regulator (VREG) depends on the voltage value ($V_{ADJ}$), so that this then closes the control loop. Preferably, the dependencies are linear.

The control chain of FIG. 1 can be massively shortened.

The corresponding device simplified in a first step for supplying several, but at least two LED groups ($LED_1$, $LED_2$, $LED_3$) with electrical energy therefore preferably comprises a voltage regulator (VREG), at least two circuits (IC1, IC2), a control bus (RB), and a resistor ($R_{GPIO}$). Each of the circuits (IC1, IC2) preferably has at least one LED connection (LED0, LED1) for at least one LED group ($LED_1$, $LED_2$, $LED_3$), at least one LED driver (LED DRY) per LED group ($LED_1$, $LED_2$, $LED_3$) for supplying power to this LED group ($LED_1$, $LED_2$, $LED_3$) via the LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) inject one or more bias currents ($I_{Bias}$) into the control bus (RB) in the form of a sum current of the injected bias currents ($I_{Bias}$) in order to set the operating point correctly. The resistor ($R_{GPOP}$) performs a current-voltage conversion of the sum current ($I_S$) into a control voltage ($V_R$). The output voltage ($V_O$) of the voltage regulator (VREG) depends on the voltage value of the control voltage ($V_R$), so that this then closes the control loop. Preferably, the dependencies are linear.

This control chain can be further shortened.

The corresponding device simplified in a second step for supplying electrical energy to several, but at least two LED groups ($LED_1$), $LED_2$, $LED_3$) preferably comprises a voltage regulator (VREG), at least two circuits (IC1, IC2), and a control bus (RB). Each of the circuits (IC1, IC2) preferably has at least one LED connection (LED0, LED1) for at least one LED group ($LED_1$, $LED_2$, $LED_3$), at least one LED driver (LED DRV) per LED group ($LED_1$, $LED_2$, $LED_3$) for supplying power to this LED group ($LED_1$, $LED_2$, $LED_3$) via the LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) feed one or more bias currents ($I_{Bias}$) in the form of a sum current ($I_S$) of the fed bias currents ($I_{Bias}$) into the control bus (RB) in order to set the operating point correctly. The output voltage ($V_O$) of the voltage regulator (VREG) depends on the current value of the sum current ($I_S$), so that this then closes the control loop. Preferably, the dependencies are linear. A current-controlled voltage regulator is required here.

A device according to the disclosure allows a regulation of the voltage regulator (VREG) in a simple manner in order to supply more complex LED arrangements supplied with electrical energy from several circuits. It was recognized that this is particularly easy with a current-controlled voltage regulator. Here, the total current ($I_S$) is the actual value signal and the input of the voltage-to-current converter (VC-C) is the exemplary input of a current controlled voltage regulator advanced by a said component (VREG, R1, R2, VC-C). In contrast to the state of the art, the construction is particularly robust against EMC radiation and potential offset due to the current-controlled signal.

LIST OF REFERENCES

ADC analog-to-digital converter, also known as measuring equipment
ADJ Control input of the voltage regulator (VREG) for the voltage control signal (VCTR)
$I_{ADJ}$ additional current
$I_{Bias}$ Constant current of the respective bias current source (IQ), which is supplied via the control bus connection of the respective integrated circuit (IC1, IC2) is fed into the control bus (RB). The bias current is preferably a current that is constant over time for setting the operating point of the proposed device.
IC1 first integrated circuit
IC2 second integrated circuit
IQ bias current source of an integrated circuit (IC1, IC2)
$I_S$ sum current of the fed bias currents ($I_{Bias}$) of all integrated circuits (IC) connected to the control bus (RB)
GND reference potential
GPIO control bus connection of the associated integrated circuit (IC1, IC2)
OP1 amplifier
$LED_1$ first LED; first group of LEDs
$LED_2$ second LED; second group of LEDs
$LED_3$ third LED; third group of LEDs
$LED_{3a}$ first LED of the third LED group ($LED_3$)
$LED_{3b}$ second LED of the third LED group ($LED_3$)
LED0 first LED connection
LED1 second LED connection
LED DRV LED driver
R1 first resistance
R2 second resistance
R3 third resistor
RB control bus
$R_i$ internal control signal
RS control signal
$R_{GPIO}$ resistance to convert the sum current ($I_S$) into a voltage
T1 first transistor
$V_O$ Output voltage of the voltage regulator (VREG) at his voltage regulator output ($V_{out}$) against the reference potential (GND)
$V_{ADJ}$ Voltage value of the voltage control signal (VCTR) against a reference potential (GND)
VC-C voltage-to-current converter (external voltage to current converter), which is preferably not part of the integrated circuits (IC1, IC2) and/or of the voltage regulator (VREG) and which can consist, for example, of a first transistor (T1), an amplifier (OP1) and a third resistor (R3).
VCTR voltage control signal
$V_R$ Control voltage at the resistor ($R_{GPIO}$)
VR local controller of an associated integrated circuit (IC1, IC2)
VREG voltage regulator
$V_{out}$ voltage regulator output of the voltage regulator (VREG)

LIST OF CITED DOCUMENTS

DE 10318780 A1
DE 102005028403 B4
DE 102006055312 A1

EP 1499165 B1
EP 2600695 B1
U.S. Pat. No. 7,157,866 B2
U.S. Pat. No. 8,319,449 B2
U.S. Pat. No. 8,519,632 B2
US 2007/0139317 A1
US 2008/0122383 A1
US 2009/0230874 A1
US 2010/0026209 A1
US 2010/0201278 A1
US 2011/0012521 A1
US 2011/0043114 A1
US 2012/0268012 A1
WO 2013/030047 A1

What is claimed is:

1. A method for regulating an output voltage of a voltage regulator for supplying a lighting device, wherein the lighting device includes at least two circuits, and each of the at least two circuits includes at least one current source, wherein each of the least one current source in each of the at least two circuits is constructed to supply a respective LED group, the method comprising:
generating the output voltage by the voltage regulator;
supplying the respective LED group using the output voltage;
measuring, by each circuit, a voltage drop of each of the current sources in the respective circuit supplying one of the respective LED groups supplied by the respective circuit;
withdrawing, by each circuit, a respective withdrawal current from a control bus based on the measured voltage drop of each of the current sources in the respective circuits;
determining a control current based on the withdrawal currents withdrawn from the control bus by each of the circuits; and
regulating the output voltage of the voltage regulator based on the control current.

2. The method of claim 1, wherein the at least two circuits include a first circuit and a second circuit, the method further comprising, prior to measuring the voltage drop of each of the current sources:
setting of a first LED group current through each of the respective LED groups supplied by the respective current source of the first circuit associated with the respective LED group of the first circuit; and
setting of a second LED group current through each of the respective LED groups supplied by the respective current source of the second circuit associated with the respective group of the second circuit.

3. The method of claim 1, further comprising:
injecting a bias current into the control bus;
wherein the control current based on the withdrawal currents includes summing the bias current and the withdrawal currents.

4. The method of claim 1, wherein withdrawing, by each circuit, the respective withdrawal current from the control bus based on the measured voltage drops of the current sources in the respective circuits includes:
detecting a separate voltage drop for each current source;
selecting a voltage drop value of one of the current sources as a characteristic voltage drop value of the circuit; and
determining the withdrawal current for the circuit based on the characteristic voltage drop value of the circuit.

5. The method of claim 4, wherein determining the withdrawal current for the circuit based on the characteristic voltage drop value of the circuit includes determining a deviation of the characteristic voltage drop value from a set value.

6. The method of claim 5, wherein the withdrawal current of the respective circuit depends linearly on the deviation of the characteristic voltage drop value from the set value.

7. The method of claim 1, wherein the voltage regulator is a current-controlled voltage regulator.

8. The method of claim 1, wherein the voltage regulator is a voltage-controlled voltage regulator, further comprising:
converting the control current to a control voltage; and
controlling the voltage regulator based on the control voltage.

9. The method of claim 1, wherein each of the circuits is an integrated circuit.

10. A device for supplying a plurality of LED groups, comprising:
a voltage regulator that generates an output voltage, wherein the output voltage supplies electrical energy to each of the plurality of LED groups;
a current bus; and
at least two circuits, each of the at least two circuits comprising:
at least one LED driver;
a voltage measuring circuit configured to measure respectively a voltage drop across each of the at least one LED driver in the respective circuit;
a controller; and
a current driver configured to extract a current from the current bus;
wherein:
the at least one LED driver of each circuit is coupled to set a current through a respective LED group of the plurality of LED groups;
the controller in each circuit is coupled to receive the respective voltage drop of each of the at least one LED driver; and
the controller is configured to determine, based on the respective voltage drops of the at least one LED driver, a characteristic voltage drop for the respective circuit;
the controller is configured to withdraw, via the current driver, a current from the current bus based on the characteristic voltage drop for the respective circuit; and
the voltage regulator is controlled based on a summed current of the current bus.

11. The device according to claim 10, wherein the voltage regulator is a current-controlled voltage regulator.

12. The device according to claim 10, further comprising a current bias circuit coupled to inject a bias current into the current bus.

13. The device according to claim 12, wherein at least one circuit includes the current bias circuit.

14. The device according to claim 10, wherein each of the at least one LED driver in each of the circuits includes a respective current source.

15. The device according to claim 14, wherein the respective current sources are current sources to ground.

16. The device of claim 10, further comprising a resistor, wherein:
the summed current of the current bus supplies the resistor; and
the voltage regulator is controlled based on the voltage drop across the resistor.

17. The device of claim 16, further comprising a voltage-to-current converter, wherein the voltage-to-current converter converts the voltage drop of the across the resistor to a control current, and the voltage regulator is controlled based on the control current.

18. The device of claim 10, wherein the voltage measuring circuit is each circuit is an analog-to-digital converter.

19. The device of claim 10, wherein the controller of each circuit determines the characteristic voltage drop for the respective circuit based on the respective voltage drops of the at least one LED driver based on an algorithm that includes determining a minimum voltage of each of the voltage drops of the at least one LED driver.

20. The device of claim 10, wherein each circuit is an integrated circuit.

* * * * *